Dec. 14, 1948.     H. V. BERONIUS     2,456,106
WELDING GUN
Filed Feb. 28, 1947
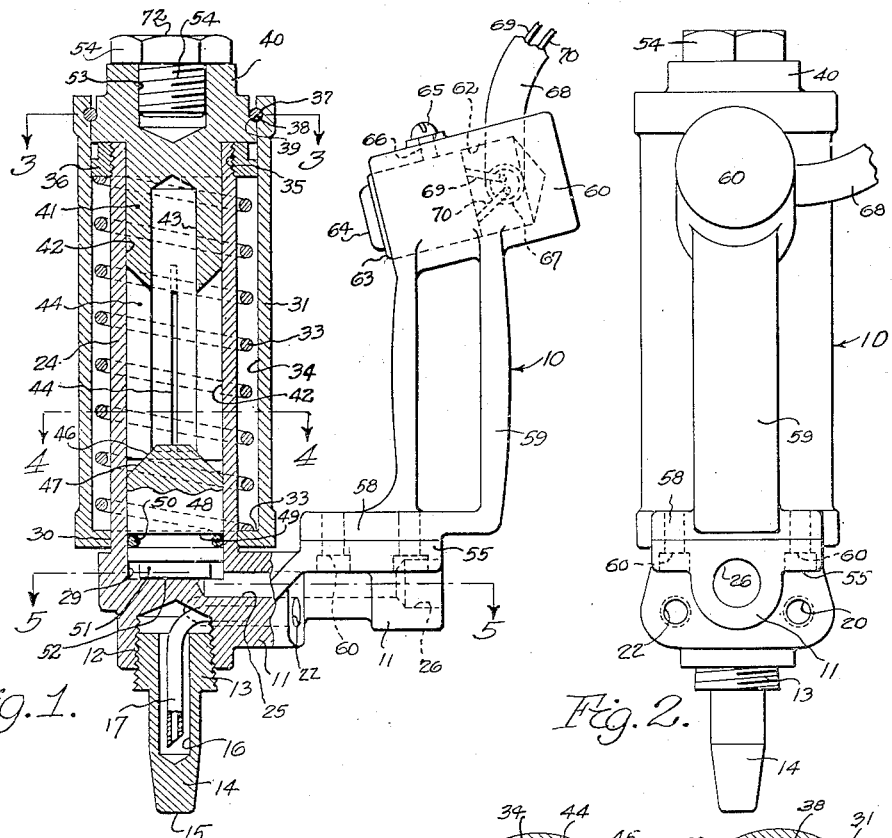
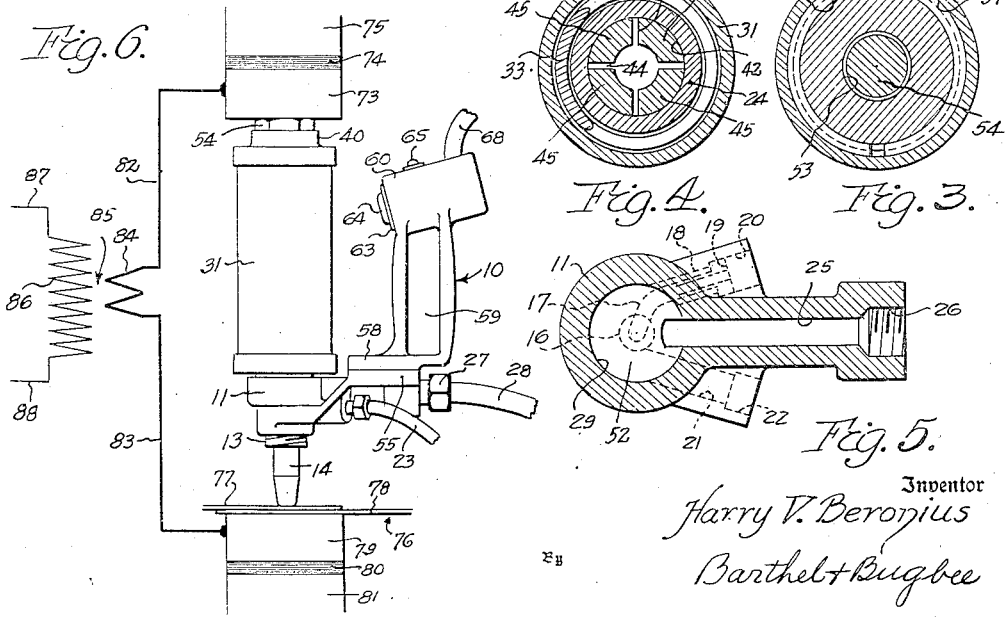
Inventor
Harry V. Beronius
Barthel + Bugbee
Attorneys Patented Dec. 14, 1948

2,456,106

UNITED STATES PATENT OFFICE 2,456,106

WELDING GUN

Harry V. Beronius, Detroit, Mich., assignor to Welding Machines Manufacturing Company, Detroit, Mich., a corporation of Michigan Application February 28, 1947, Serial No. 731,539

3 Claims. (Cl. 219—4)

This invention relates to welding equipment and in particular to welding guns for spot welding.

One object of this invention is to provide a welding gun having a movable plunger connected to the welding electrode and means for improving the electrical contact between the plunger and the gun in which it reciprocates.

Another object is to provide a welding gun as set forth in the preceding object wherein means is provided for forcibly moving the plunger and the adjacent portion of the welding gun into more intimate contact with one another at the end of the stroke, thereby decreasing the resistance offered to the passage of the welding current and consequently reducing the heating effect within the gun while increasing the efficiency thereof.

Another object is to provide a welding gun, as set forth in the preceding objects, wherein the welding electrode is attached to a hollow plunger which reciprocates relatively to a hollow split stem and which contains an auxiliary plunger for spreading the walls of the stem apart so that they more firmly engage the inner wall of the hollow plunger, thereby enhancing the electrical contact between them and correspondingly reducing the resistance offered to the passage of the welding current between the stem and the plunger.

Other objects and advantages of the invention will become apparent during the course of the following description of the accompanying drawings, wherein:

Figure 1 is a side elevation, partly in central vertical section, through a welding gun, according to a preferred form of the invention;

Figure 2 is a right-hand side elevation of the welding gun shown in Figure 1;

Figure 3 is a horizontal cross-section through the welding gun taken along the line 3—3 in Figure 1;

Figure 4 is a horizontal cross-section through the welding gun taken along the line 4—4 in Figure 1, showing details of the split stem;

Figure 5 is a horizontal cross-section through the welding gun, near the bottom thereof, taken along the line 5—5 in Figure 1 and showing the passages for pressure fluid and for cooling liquid respectively; and Figure 6 is a diagrammatic side elevation showing the welding gun of Figure 1 in use between a pair of abutments, for welding a pair of metal sheets.

Hitherto, in welding guns for spot welding operations, it has been customary to move the welding electrode into contact with the workpieces by means of a plunger reciprocating in a cylinder supplied with pressure fluid, either hydraulic or pneumatic. In such welding guns the contact between the plunger and the walls of the cylinder is relied upon to furnish a part of the path over which the electric welding current runs on its way to the electrode. Since the plunger moves relatively to the cylinder, however, the contact between them is at best inefficient because the plunger must reciprocate freely in the cylinder and accordingly a sufficient clearance must be provided.

Since the welding current is of a very low voltage, even though of a high amperage, it does not easily cross the gap between the cylinder and plunger without causing resistance which results in heating up the gun. This heat interferes with the efficiency of the gun and reduces the amount of current reaching the welding electrode. Where a non-conducting lubricant such as oil is employed in the cylinder for lubricating the plunger, this oil still further increases the resistance to the passage of current and thus still further reduces the efficiency of the welding gun.

The present invention solves this problem by providing means for forcing the plunger and cylinder into more intimate contact with each other after the completion of the stroke of the plunger, so that a greatly improved electrical contact is obtained between the cylinder and plunger. Any lubricant used is squeezed out of the space between the cylinder and plunger and the efficiency of the gun is still further increased. In this manner, the electrical resistance is reduced and consequently, the heating effect thereof is likewise reduced.

Referring to the drawings in detail, Figure 1 shows a welding gun, generally designated 10, according to a preferred form of the invention as consisting of an electrode holder 11 having a threaded bore 12 for receiving the threaded end 13 of a hollow welding electrode 14 having an end 15 which is to be brought into contact with the work piece. The electrode 14 is provided with an internal cavity 16 opening into the bore 12 and a coolant pipe 17 extends downward into the cavity 16 and passes through a passageway 18 and has a head 19 fitting into an inlet port 20 (Figure 5) which in turn is connected to a coolant supply line (not shown). The electrode holder is also provided with a coolant discharge passageway 21 (Figures 2 and 5) opening into the bore 12 and having an outlet port 22 connected to a coolant discharge line 23 for carrying away the coolant liquid, such as water, which has been heated up during the process of cooling the electrode 14.

The electrode holder 11 is also provided with an upwardly extending cylindrical plunger portion 24 and contains a pressure fluid passageway 25 leading to an outlet port 26 which is connected by the coupling 27 to a fluid pressure supply line 28. The passageway 25 opens into the lower end of the plunger bore 29. The outer wall of the hollow plunger 24 passes through an opening 30 in the bottom of a cylinder 31 and has a coil spring 32 abutting the lower end wall 33 of the cylinder bore 34 (Figure 1). The upper end of the hollow plunger 24 is threaded as at 35 to receive a retaining ring 36 which serves as an abutment for the upper end of the coil spring 32 and also slidably engages the cylinder bore 34.

The upper end of the cylinder bore 34 is provided with an annular groove 37 for receiving a snap ring 38 (Figures 1 and 3) the inner rim of which is seated in an annular recess 39 in the head 40 of a hollow stem 41. The stem 41 has an outer wall 42 snugly fitting the inner bore 29 of the hollow plunger 24, yet with a sufficient clearance to permit the plunger 24 to reciprocate freely along the stem 41.

The stem 41 is provided with an internal longitudinal bore or recess 43, the side walls of which are provided with slots 44 forming fingers 45 extending downward to the lower end of the stem 41, the latter being provided with a beveled seat 46 at that point. Fitting into and mating with the conical seat 46 is the conical head 47 of an auxiliary plunger 48 (Figure 1) which reciprocates in the inner bore 42 of the plunger 24. The auxiliary plunger 48 is provided with an annular groove 49 having a sealing ring or packing ring 50 seated therein. The packing ring 50 is of any yielding or resilient material such as synthetic rubber. The auxiliary plunger 48 is also provided with a reduced diameter portion 51 extending downward and engageable with the bottom wall 52 of the plunger bore 42. The head 40 of the stem 41 is provided with a threaded bore 53 at the top thereof for receiving the threaded shank of a cap screw 54, the latter serving as an abutment which may easily be replaced when it is dented, worn, or otherwise damaged.

The electrode holder 11 is provided with an offset shelflike portion 55 which contains the fluid pressure passageway 25 and port 27 and which also has a flat upper surface to which the end 58 of a handle 59 is attached, as by screws 60. The upper end of the handle 59 is provided with an enlargement or boss 61 having a cavity 62 therein for receiving a push-button switch 63 operated by a push button 64 and held in position by a set screw 65 threaded into the transverse hole 66. The boss 61 is also provided with a transverse hole 67 through which a conductor cable 68 with conductors 69 and 70 therein enters the cavity 62. The conductors 69 and 70 are connected to the terminals of the push button switch 63 and at their opposite ends are connected to a conventional remote control mechanism (not shown) the details of which form no part of the present invention. This remote control mechanism is operated by the depressing of the push button 63 to operate a valve which admits pressure fluid through the supply line 28 to engage the electrode 14 with the work, and also to cause the welding current to flow through the gun 10 and electrode 14 to the workpiece, as described in connection with the operation of the invention.

In the assembly of the invention, with the cylinder 31 and plunger 24 moved away from one another, the head 40 of the stem 41 is pushed inward and downward beyond the position shown in Figure 1, so that the annular shoulder 39 surrounding the head 40 is below the level of the annular recess 37. While the parts are in this position, the snap ring 38 is pushed down into the cylinder bore 34 until it snaps into the recess 37, whereupon the head 40 of the stem 41 is released and moves upward until its annular shoulder 39 engages the snap ring 38. This construction holds these parts in assembly.

*Operation*

In the operation of the invention, the gun 10 is ordinarily used with the upper surface 72 of the cap screw 54 in engagement with a fixed upper abutment 73 (Figure 6) which is preferably insulated by an insulating layer 74 from a supporting abutment 75. The work 76, for example thin sheets of metal 77 and 78 which are intended to be welded, is placed upon a lower abutment 79 which is insulated by a layer of insulating material 80 from a lower support 81. The two abutments 73 and 79 are connected by conductors 82 and 83 respectively to the winding 84 of one coil of a welding transformer 85, the other coil 86 of which is connected by conductors 87 and 88 to a source of electric current.

To weld the workpieces 77 and 78, these are placed upon the abutment 79 and the welding gun 10 moved into position between the abutments 73 and 79. The welding transformer 85 is energized by connecting the conductors 87 and 88 to a source of electric current. Meanwhile, cooling water is caused to flow into the port 20 (Figure 5) and downward through the tube 17 into the electrode recess 16 and thence out through the port 22 and pipe 23. The operator now depresses the push button 64 of the push button switch 63, setting the remote control mechanism in operation to cause pressure fluid, such as compressed air or oil or water under pressure, to pass through the supply pipe 28 into the plunger bore 29.

The pressure fluid acting between the annular surface 49 at the bottom of the auxiliary plunger 48 and the surface 52 at the end of the hollow plunger 24 forces the latter downward and carries with it the electrode 14. Meanwhile the auxiliary plunger 48 is temporarily held immovable by the engagement of the cap screw 72 in the head of the stem 41 with the upper abutment 73.

When the electrode 14 encounters the workpieces 77 and 78, it forces them firmly together and halts. This causes the pressure to rise in the plunger bore 29, and this pressure acts on the lower end of the auxiliary plunger 48, forcing its conical head portion 47 upward into the conical seat 46. This wedge-like action in turn forces the fingers 45 apart, pushing their outer surfaces firmly into engagement with the walls of the plunger bore 42, squeezing out any lubricant which may be on the walls thereof. This action spans the gap which is the normal clearance necessary for free reciprocation between the hollow plunger 24 and the stem 41 and brings the fingers 45 into more intimate electrical contact with the plunger 24. The welding current then passes freely between the abutments 73 and 79 by way of the welding gun 10 and its electrode 14 while the workpieces 77 and 78 are strongly compressed, spot-welding these to each other.

By thus effecting a firmer engagement and more intimate electrical contact between the fingers 45 of the stem 41 and the inner wall of the hollow plunger 24, the resistance offered to the flow of current is greatly reduced and the efficiency of the welding operation correspondingly increased. This also greatly reduces the heating of the gun, which previously occurred from the resistance caused by the necessity for the welding current to cross the gap between the cylinder and plunger of the welding gun.

What I claim is:

1. A welding gun comprising a pair of relatively reciprocable structures connected in series with the welding current circuit, a holder for a welding electrode connected to one of said structures, a fluid pressure motor including relatively reciprocable tubular plunger and cylinder elements operatively connected respectively to said structures for reciprocating said structures relatively to one another to engage the electrode in said electrode holder with the work to be welded, an expansible tubular stem connected to said plunger element and projecting telescopingly into said tubular plunger element, said stem and said plunger being of electrically-conducting material and an auxiliary piston reciprocably mounted in said tubular plunger element in expanding relationship with said stem, one of said structures having a fluid passageway therein communicating with the interior of said tubular plunger and responsive to the supplying of pressure fluid thereto for moving said auxiliary piston into engagement with said stem and expanding said stem into enhanced electrical contact with said plunger.

2. A welding gun comprising a pair of relatively reciprocable structures connected in series with the welding current circuit, a holder for a welding electrode connected to one of said structures, a fluid pressure motor including relatively reciprocable tubular plunger and cylinder elements operatively connected respectively to said structures for reciprocating said structures relatively to one another to engage the electrode in said electrode holder with the work to be welded, an expansible tubular stem connected to said plunger element and projecting telescopingly into said tubular plunger element, said stem and said plunger being of electrically-conducting material and an auxiliary piston reciprocably mounted in said tubular plunger element in expanding relationship with said stem, one of said structures having a fluid passageway therein communicating with the interior of said tubular plunger and responsive to the supplying of pressure fluid thereto for moving said auxiliary piston into engagement with said stem and expanding said stem into enhanced electrical contact with said plunger, said piston and the adjacent end of said stem having mutually engaging mating conical portions thereon.

3. A welding gun comprising a pair of relatively reciprocable structures connected in series with the welding current circuit, a holder for a welding electrode connected to one of said structures, a fluid pressure motor including relatively reciprocable plunger and cylinder elements operatively interconnecting said structures for reciprocating said structures relatively to one another to engage the electrode in said electrode holder with the work to be welded, one of said elements having a longitudinally split portion projecting therefrom and an auxiliary piston in said motor, said piston and the adjacent end of said longitudinally split portion having mating conical portions responsive to the supplying of pressure fluid to said motor for forcibly urging said last-mentioned element into enhanced electrical contact with the other element.

HARRY V. BERONIUS.

REFERENCES CITED

The following references are of record in the file of this patent:

UNITED STATES PATENTS

| Number | Name | Date |
| --- | --- | --- |
| 2,233,897 | Nichols | Mar. 4, 1941 |
| 2,293,337 | Harris | Aug. 18, 1942 |
| 2,314,320 | Van Eck | Mar. 16, 1943 |